United States Patent
Jasinskyj

(10) Patent No.: US 9,660,888 B2
(45) Date of Patent: *May 23, 2017

(54) EDGE ANALYTICS QUERY FOR DISTRIBUTED CONTENT NETWORK

(71) Applicant: Limelight Networks, Inc., Tempe, AZ (US)

(72) Inventor: Lonhyn T. Jasinskyj, Portola Valley, CA (US)

(73) Assignee: Limelight Networks, Inc., Tempe, AZ (US)

( * ) Notice: Subject to any disclaimer, the term of this patent is extended or adjusted under 35 U.S.C. 154(b) by 1016 days.

This patent is subject to a terminal disclaimer.

(21) Appl. No.: 13/886,070

(22) Filed: May 2, 2013

(65) Prior Publication Data

US 2014/0156798 A1 Jun. 5, 2014

Related U.S. Application Data

(63) Continuation of application No. 13/693,879, filed on Dec. 4, 2012, now Pat. No. 8,447,854.

(51) Int. Cl.
*G06F 15/16* (2006.01)
*H04L 12/26* (2006.01)
*H04L 29/08* (2006.01)

(52) U.S. Cl.
CPC .......... *H04L 43/0876* (2013.01); *H04L 67/22* (2013.01); *H04L 67/289* (2013.01)

(58) Field of Classification Search
CPC .... H04L 43/0876; H04L 67/289; H04L 67/22
See application file for complete search history.

(56) References Cited

U.S. PATENT DOCUMENTS

| | | | |
|---|---|---|---|
| 6,208,977 B1 | 3/2001 | Hernandez et al. | |
| 6,377,982 B1 | 4/2002 | Rai et al. | |
| 6,654,807 B2* | 11/2003 | Farber | G06F 9/505 707/E17.119 |
| 6,996,616 B1* | 2/2006 | Leighton | H04L 29/12009 707/999.01 |
| 7,054,935 B2* | 5/2006 | Farber | G06F 9/505 707/E17.119 |

(Continued)

OTHER PUBLICATIONS

Chuck Fraleigh et al., "Packet-Level Traffic Measurements from the Sprint IP Backbone" Retrieved on Jan. 16, 2013 from http://www.ece.ucdavis.edu/-chuah/classes/EEC274/refs/FML03-ipmon.pdf, Nov. 2003, 12 Pages.

(Continued)

*Primary Examiner* — Douglas Blair
(74) *Attorney, Agent, or Firm* — Kilpatrick Townsend & Stockton LLP

(57) ABSTRACT

A system and method for accelerating web page delivery is disclosed in one embodiment. Web content requests are made to an edge server of a first point of presence (POP) of a content delivery network (CDN). The web content has embedded resource links. The first POP can rewrite the embedded resource links to route requests for the embedded resource links to any POP in the CDN or even the origin server. In some embodiments, the first POP can decide if the first POP and/or another POP referenced in a rewritten embedded resource link should cache and/or accelerate the resource referenced in the embedded resource link.

19 Claims, 14 Drawing Sheets

(56) References Cited

U.S. PATENT DOCUMENTS

| | | | |
|---|---|---|---|
| 7,240,100 B1 * | 7/2007 | Wein | H04L 67/1008 709/214 |
| 7,373,416 B2 * | 5/2008 | Kagan | H04L 47/122 709/219 |
| 8,073,940 B1 * | 12/2011 | Richardson | H04L 67/1097 709/200 |
| 8,122,098 B1 * | 2/2012 | Richardson | H04L 61/1511 709/217 |
| 8,214,450 B2 * | 7/2012 | Raciborski | H04L 29/06027 705/402 |
| 8,239,514 B2 * | 8/2012 | Richardson | H04L 67/1097 709/200 |
| 8,447,854 B1 * | 5/2013 | Jasinskyj | H04L 43/0876 709/224 |
| 8,484,319 B2 * | 7/2013 | Wein | H04L 67/1008 707/769 |
| 9,167,036 B2 * | 10/2015 | Seed | H04L 67/1095 |
| 2006/0149848 A1 | 7/2006 | Shay | |
| 2007/0067424 A1 * | 3/2007 | Raciborski | H04L 29/06027 709/223 |
| 2008/0215748 A1 | 9/2008 | Kagan et al. | |
| 2011/0072127 A1 * | 3/2011 | Gerber | H04L 43/08 709/224 |
| 2011/0307584 A1 * | 12/2011 | Leighton | H04L 29/12009 709/219 |
| 2012/0072600 A1 * | 3/2012 | Richardson | H04L 67/1097 709/226 |
| 2012/0089700 A1 * | 4/2012 | Safruti | H04L 67/2842 709/217 |
| 2012/0124165 A1 * | 5/2012 | Richardson | H04L 61/1511 709/217 |
| 2012/0151016 A1 * | 6/2012 | Wein | H04L 67/1008 709/219 |
| 2012/0246298 A1 * | 9/2012 | McGowan | H04L 67/22 709/224 |
| 2012/0246299 A1 | 9/2012 | Carls | |
| 2012/0303819 A1 * | 11/2012 | Richardson | H04L 67/1097 709/226 |
| 2012/0321052 A1 * | 12/2012 | Morrill | H04L 29/06027 379/32.01 |
| 2012/0327816 A1 * | 12/2012 | Morrill | H04M 15/00 370/259 |
| 2012/0330804 A1 * | 12/2012 | Morrill | H04M 15/00 705/34 |
| 2013/0238472 A1 * | 9/2013 | Fan | G06Q 30/04 705/34 |
| 2013/0238473 A1 * | 9/2013 | Fan | G06Q 30/04 705/34 |
| 2015/0195354 A1 * | 7/2015 | Lyon | H04N 21/2385 709/203 |

OTHER PUBLICATIONS

PeerApp "UBinsight™" Retrieved on Jan. 16, 2013 from http://www.peerapp.com/products/UBinsight.aspx, Feb. 23, 2011.

U.S. Pat. No. 8,447,854 issued May 21, 2013, Selected File History, 17 pgs.

* cited by examiner

EDGE ANALYTICS QUERY FOR DISTRIBUTED CONTENT NETWORK

CROSS-REFERENCE TO RELATED APPLICATION

This application is a continuation of U.S. application Ser. No. 13/693,879 filed Dec. 4, 2012. The referenced application is hereby incorporated by reference in its entirety for all purposes.

BACKGROUND

This disclosure relates in general to content delivery networks (CDNs) and, but not by way of limitation, to gathering analytics relating to the operation of the CDN across a number of points of presence (POPs).

Analytics are used in a CDN at the most basic level for accounting of use by customers so that they may be billed accurately. Richer information is gathered in log files that are aggregated from the various POPs and stored for query or provided back to customers. Queries against the log files are possible, but their sheer size makes that difficult and not practical in real time. The log files are delayed by hours as the information is gathered from all the POPs and aggregated centrally.

The amount of analytics data gathered by a CDN is skyrocketing. Many terabytes are produced every day. An ever-increasing part of the bandwidth and processing resources for the CDN are consumed by this process. Much of the analytics data is gathered without ever being used. All the resources being consumed for information that is under-utilized is inefficient. If current trends continue, analytics data will be a large part of the cost for delivery of content through the Internet.

SUMMARY

In one embodiment, a system and method for gathering analytics for a content delivery network (CDN) having a plurality of points of presence (POPs) is disclosed. Each POP has a plurality of edge servers that each gather analytics information related to delivery of content. For a particular customer account, a cube of data that is a subset of the analytics information is gathered by the plurality of edge servers. The cube of data is passed along a data bus for aggregation periodically. On occasion, cubes of data can exceed a predetermined threshold. Any POP and/or edge server can test for excess in a cube of data and originate a message that will shut down gathering of that cube of data across the CDN. The message can be sent through a hub server, hierarchy of servers or among peers in various embodiments.

In another embodiment, a content delivery network (CDN) having a plurality of points of presence (POPs) to deliver content for a plurality of customer accounts is disclosed. The CDN includes one or more processors and one or more storage media for retaining the instructions that work in concert to perform the functionality described in this paragraph. The one or more processors execute instructions to: gather first analytics information from a first POP, and gather second analytics information from a second POP. The first analytics information is a first subset of a first information stream gathered within the first POP, and the second analytics information is a second subset of a second information stream gathered within the second POP. The first analytics information is related to content delivery for a customer account, and the second analytics information is related to content delivery for the first customer account. The first and second customer accounts are part of the plurality of customer accounts. The first and second POPs are part of the plurality of POPs. When it is determined that the second subset reaches a predetermined threshold, a second process that produces the second subset from the second information is stopped. A notification is sent away from the second POP indicating that the predetermined threshold was reached. A notification is received at the first POP indicating that the predetermined threshold was reached. A first process is stopped that produces the first subset from the first information even though the predetermined threshold has not been reached at the first POP.

In still another embodiment, a method for delivering content with a CDN having a plurality of POPs that deliver content for a plurality of customer accounts is disclosed. In one step, first analytics information is gathered from a first POP. Second analytics information is gathered from a second POP. The first analytics information is a first subset of a first information stream gathered within the first POP, and the second analytics information is a second subset of a second information stream gathered within the second POP. The first analytics information is related to content delivery for a customer account, and the second analytics information is related to content delivery for the first customer account. The first and second customer accounts are part of the plurality of customer accounts. The first and second POPs are part of the plurality of POPs. It is determined that the second subset reaches a predetermined threshold. A second process that produces the second subset from the second information is stopped. Notification is sent away from the second POP indicating that the predetermined threshold was reached. A notification is received at the first POP indicating that the predetermined threshold was reached. A first process is stopped that produces the first subset from the first information even though the predetermined threshold has not been reached at the first POP.

In yet another embodiment, a computer readable media with instructions for delivering content with the CDN having the plurality of POPs that deliver content for the plurality of customer accounts is disclosed. The computer readable media includes computer-executable code for causing performance of the functionality described in this paragraph. First analytics information is gathered from a first POP. Second analytics information is gathered from a second POP. The first analytics information is a first subset of a first information stream gathered within the first POP, and the second analytics information is a second subset of a second information stream gathered within the second POP. The first analytics information is related to content delivery for a customer account, and the second analytics information is related to content delivery for the first customer account. The first and second customer accounts are part of the plurality of customer accounts. The first and second POPs are part of the plurality of POPs. It is determined that the second subset reaches a predetermined threshold. A second process that produces the second subset from the second information is stopped. Notification is sent away from the second POP indicating that the predetermined threshold was reached. A notification is received at the first POP indicating that the predetermined threshold was reached. A first process is stopped that produces the first subset from the first information even though the predetermined threshold has not been reached at the first POP.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
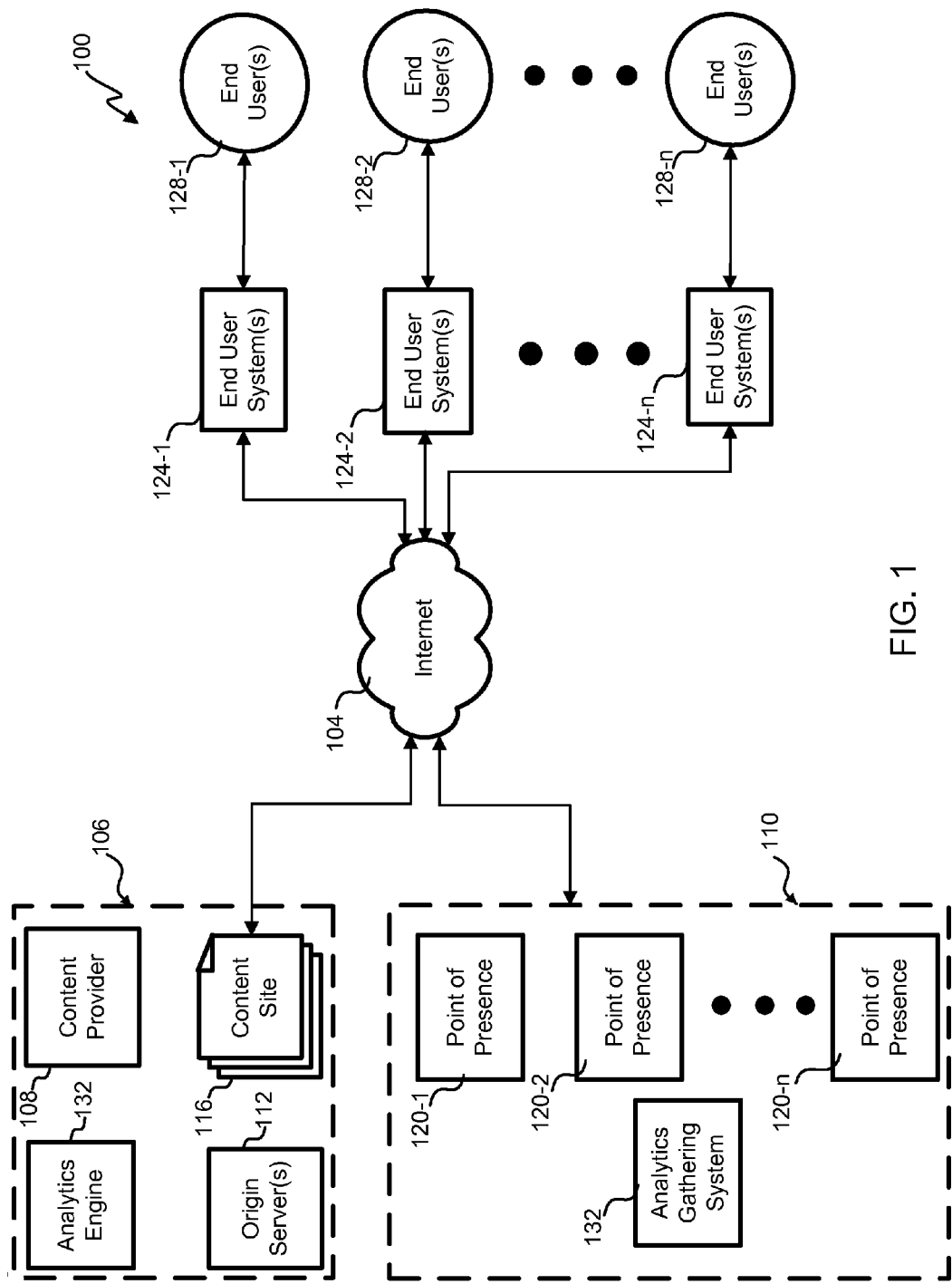
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve content objects (e.g., Javascript applets, images, Hypertext Markup Language (HTML), videos, Flash animations, cloud computing services, etc.) over the Internet 104 to end user systems 124 by an efficient use of caches, processors and acceleration within the CDN 110. The CDN 110 receives a universal resource indicator (URI) and serves that content regardless of whether the content is currently stored in the CDN. The CDN 110 typically receives only the URI to make all delivery and processing choices from the application running on the end user system 124.

An end user 128 may request a set of content objects, e.g., by requesting a URI for a webpage associated with one or more of content objects. For example, a user may request a file, such as a HTML file. The HTML file may include dynamic content that is customized for some or groups of end users 128. A source of each of the content objects and/or the file may be on an edge server, a host server within the CDN, the origin server 112, the content site 116, or on a cache in another POP 120.

A content originator 106 produces and/or distributes content objects as the originator of content in a digital form for distribution with the Internet 104. Included in the content originator 106 are a content provider 108, a content site 116, an analytics engine 132, and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object. The origin servers 112 for a given content site 116 could be widely distributed with some even being hosted within the CDN 110.

Tracking of content delivery is performed by the content originator 106 and CDN 110. The CDN 110 includes an analytics gathering system 132 that gathers metrics on services offered for customers to allow for billing and for other purposes that can be dictated by the content originator 106. Although shown separately, the analytics gathering system 132 is dispersed among several POPs 120. Components of the analytics gathering system 132 in each POP 120 gather both log information and more highly processed summary information on the operations for customers. The logs and processed information are accumulated centrally in a hub and spoke configuration with possible regional aggregation.

The content originator 106 has an analytics engine 132 for gathering metrics on all the serverices they may use. The various CDN and other distributors of content used by the content originator 106 report their respective analytics to the analytics engine 132. Information reported by the content distributors can be log files, contemporaneous queries or queries preformulated that are reported periodically.

Although this figure only shows a single content originator 106 and a single CDN 110, there may be many of each in other embodiments. The content object is any content file or content stream and could include, for example, video, pictures, advertisements, applet, data, audio, software, HTTP content, and/or text. The content object could be live, delayed or stored. Throughout the specification, references may be made to a content object, content, and/or content file, but it is to be understood that those terms could be generally used interchangeably wherever they may appear. Some content is dynamic in that different end users 128 get different variations of the content, such that the dynamic content is not easily cached at the edge with the variations being pushed out of the cache before they might be requested again.

Many content providers 108 use the CDN 110 to deliver the content objects over the Internet 104 to end users 128. When a content object is requested by an end user 128, the CDN 110 may retrieve the content object from the content provider 108 for loading in a cache or hosting for a period of time. Alternatively, the content provider 108 may directly provide the content object to the CDN 110 for hosting, i.e., in advance of the first request or in servicing the first request. In one embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror. The CDN 110 can store entire content objects or portions of content objects.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 124. A wide area network (WAN), the Internet 104 and/or other backbone may couple the POPs 120 with each other and also couple the POPs 120 with other parts of the CDN 110. Other embodiments could couple POPs 120 together with the Internet 104 optionally using encrypted tunneling.

When an end user 128 requests a content link through its respective end user system 124, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content originator 106 is accessed through a content web site 116 in this embodiment by the end user system 124. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet-terms, defined by the fabric of the Internet and/or some other mechanism. Other embodiments could find a POP 120 close to the end user system 124 using domain name service (DNS) diversion, redirection, Anycast and/or other techniques. The particular POP 120 then assigns or routes the request to an edge server. On occasion, the edge server could be in a POP 120 other than the one originally receiving the request. Choosing an edge server in another POP 120 could be done for any number of reasons, including loading or resource allocation or refinements in determining the location of the end user system 124.

The particular POP 120 may retrieve the portion of the content object from the content provider 108. Alternatively, the content provider 108 may directly provide the content object to the CDN 110 and its associated POPs 120, i.e., in advance of the first request. In one embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request to the end user system 124 may access the requested content—either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a hosting server, a relay server or ingest server. If part or all of the content cannot be found in the POP 120 originally receiving the request, neighboring POPs 120 could serve as the source in some cases, or the content could be sourced from the content originator 106.

Thus, a request from an end user system 124 for content may result in requests for content from one or more servers in the CDN 110. A CDN server (e.g., an edge server, peer servers, an origin or host server, etc.) may analyze requested content objects (e.g., requested HTML files), determined versions of the content objects that are cached locally, and transmit to other CDN servers a modified requested for content objects while signaling the versions of the content objects that are cached locally.

The end user system 124 processes the content for the end user 128 upon receipt of the content object. The end user system 124 could be a personal computer, media player application, browser-based applet, handheld computer Internet appliance, phone, IPTV set top, streaming radio or any other device that can receive and play content objects. In some embodiments, a number of end user systems 124 can be networked together sharing a single connection to the Internet 104. Changes could be made by the CDN 110 that does not affect the end user realization of the content except to speed delivery.

Figure 2A:
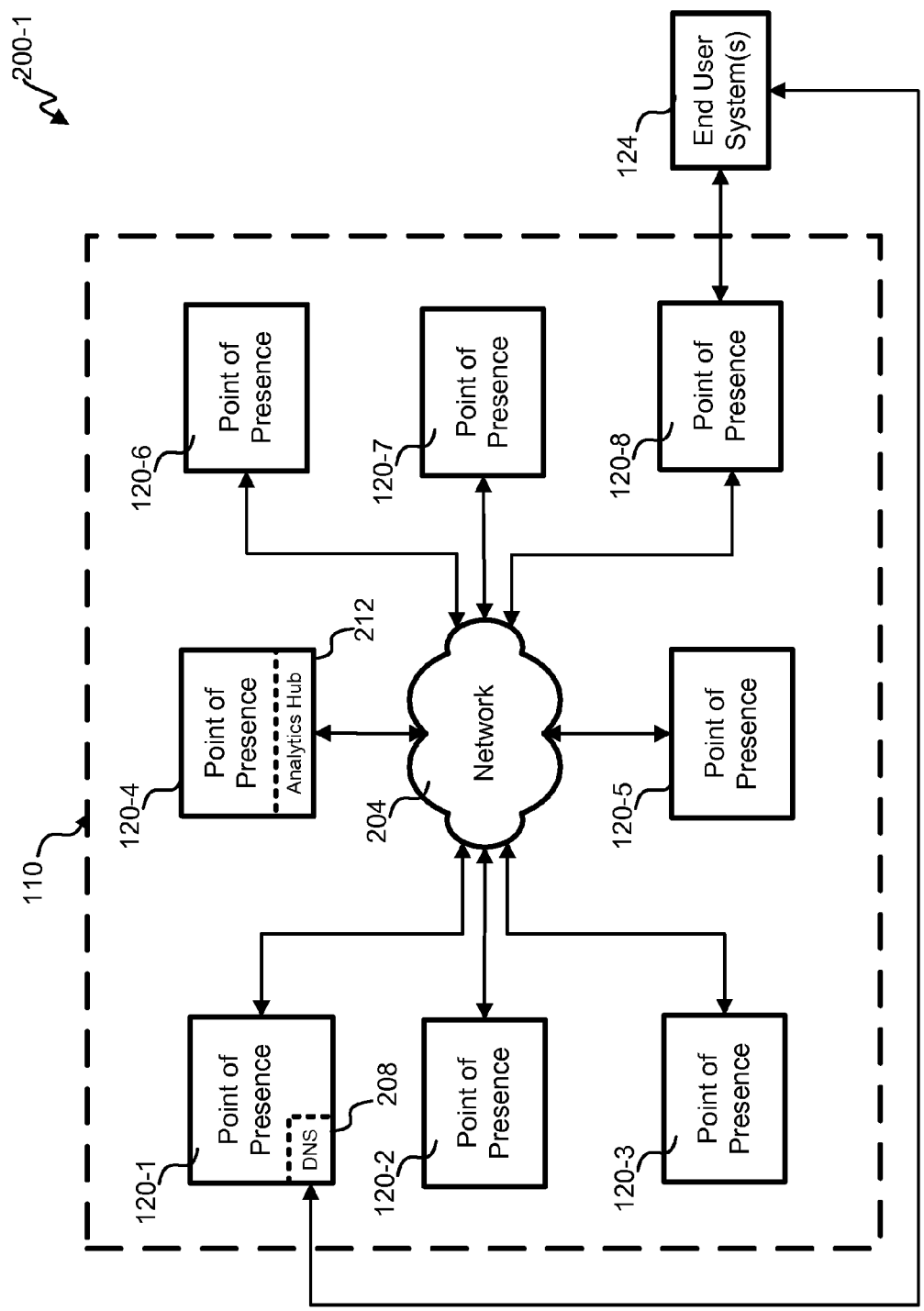
FIGS. 2A and 2B depict block diagrams of embodiments of web delivery system.

With reference to FIG. 2A, a block diagram of an embodiment of web delivery system 200-1 is shown. In this example, there are eight POPs 120 all interconnected by a network 204 that may include both private WAN or Internet 104 elements to allow communication between the POPs 120. Each of the POPs 120 is capable of delivering content, cloud computing resources, processing, gathering analytics, and/or other services. In this embodiment, the CDN 110 provides domain name service (DNS) resolutions that allow assignment of any of the POPs 120 to a request, but other embodiments could use routing, Anycast, redirection or other methods to assign a request to a particular POP 120.

A subset of POPs 120 can host services that are not available in some or all of the other POPs 120. In this embodiment, the fourth POP 120-4 has an analytics hub 212 that gathers analytics information from its POP 120-4 and the other POPs 120. There can be regional aggregators of analytics information that report to the analytics hub 212 in other embodiments. The first POP 120-1 has DNS 208 that resolves the POP 120 or edge server that will service the request made by the end user system 124. In this example, the DNS 208 assigns the eighth POP 120-8 to perform the requested task as part of the DNS resolution.

Figure 2B:
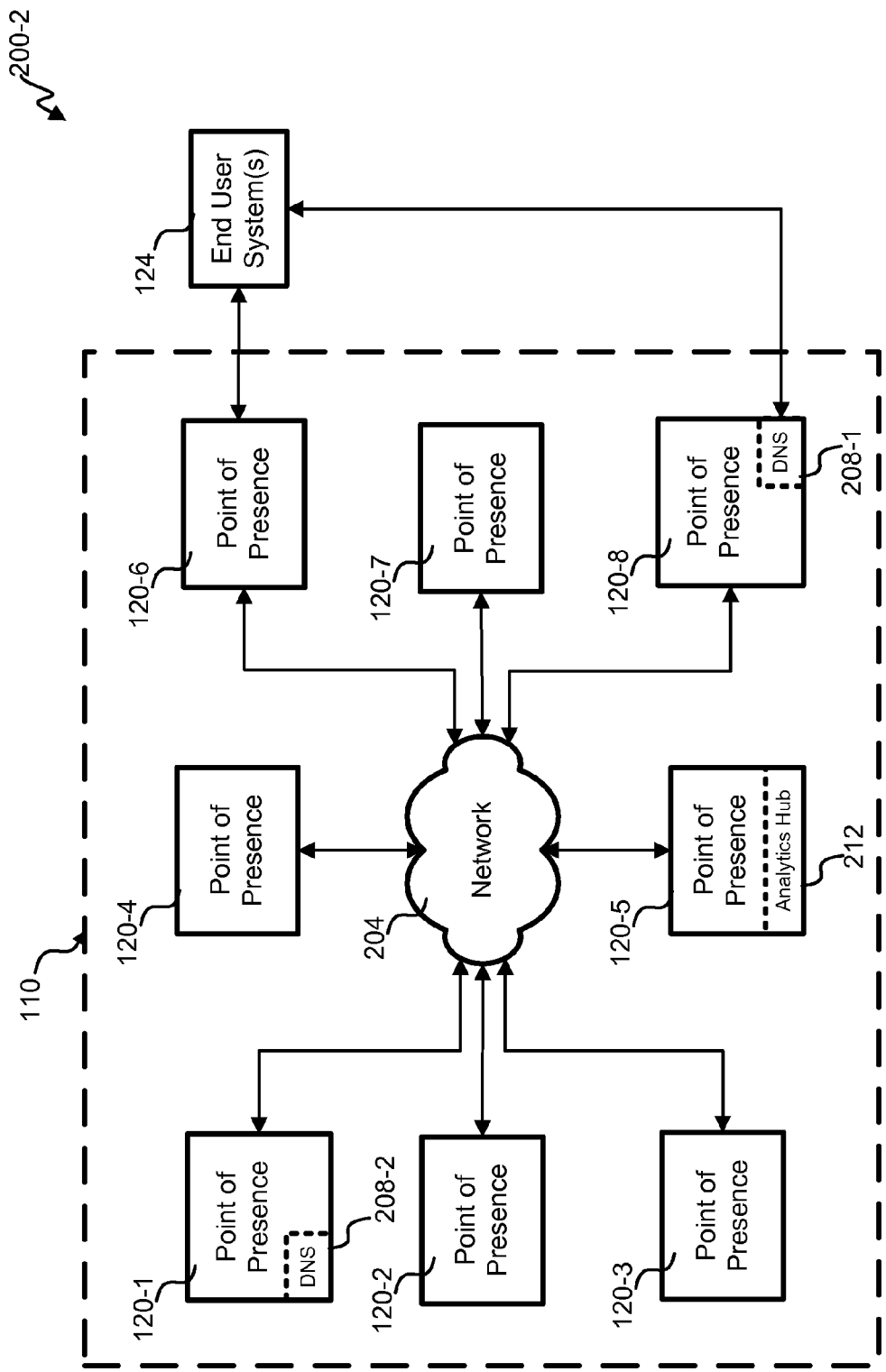

Referring next to FIG. 2B, a block diagram of an embodiment of web delivery system 200-2 is shown. In this embodiment, the fifth POP 120-5 has the analytics hub 212.

The first and eighth POPs 120-1, 120-8 have DNS 208 that could be chosen using a protocol like Anycast. The end user system 124 is assigned to the sixth POP 120-6 for servicing the URI request. The eighth POP 120-8 provided the address for the sixth POP 120-6 so the request could be made.

Figure 3:
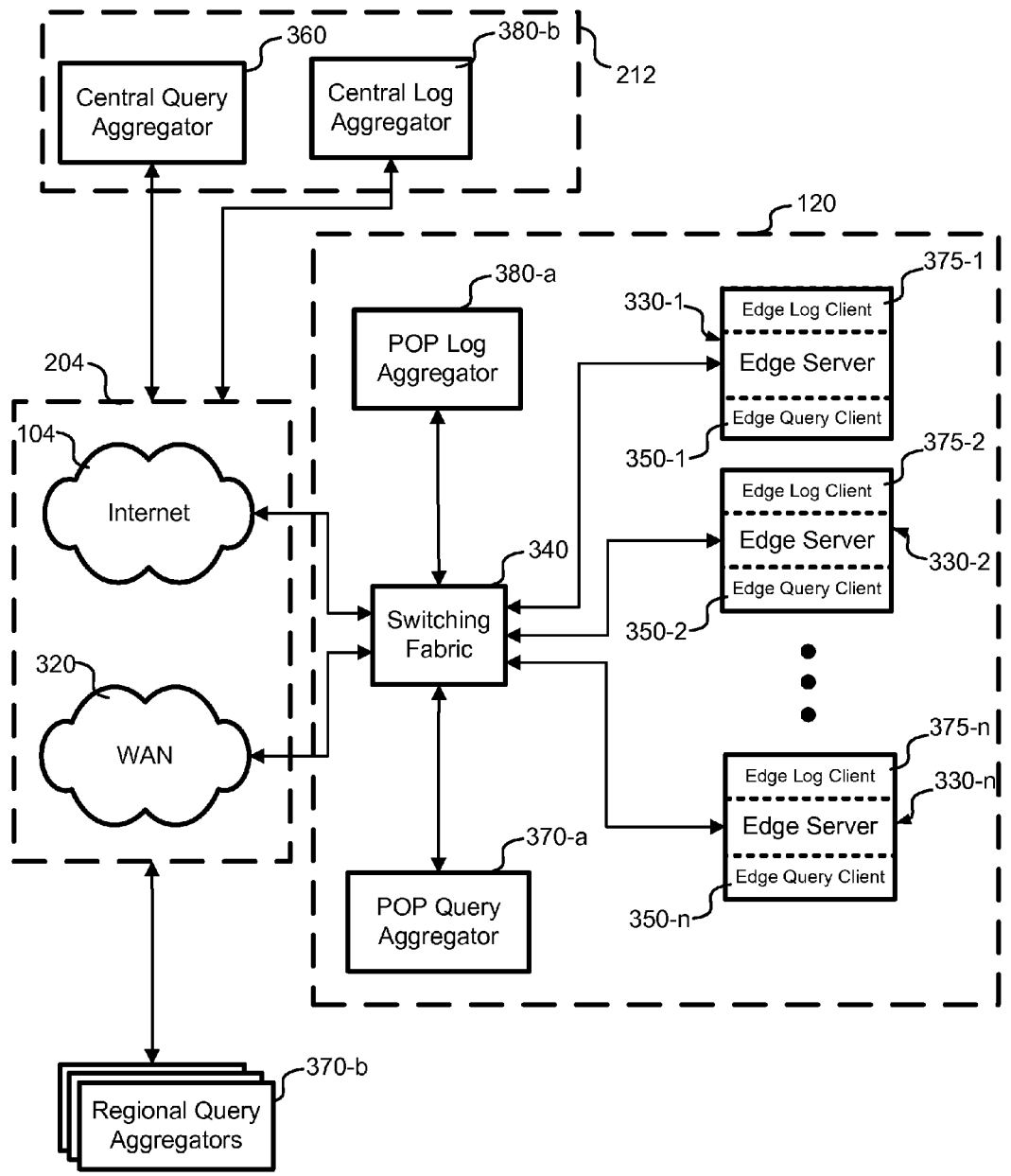
FIG. 3 depicts a block diagram of an embodiment of a point of presence (POP) with portions of an analytics system.

Referring next to FIG. 3, a block diagram of an embodiment of a POP 120 with portions of an analytics system 132 is shown. A number of edge servers 330 are used to perform various functions in the POP 120. The edge servers 330 are hardware computers that can have one or more different functions instantiated for performing the various functions of the POP 120. The instantiations can be scaled up and down as different services are requested from the POP 120. The services offered include content hosting, content caching, web acceleration, compression, video and/or audio streaming, domain name service, cloud computing, gaming hosting, flash engines, encoding, etc. A particular edge server 330 can have several instantiations of the same or different services running simultaneously.

The switching fabric 340 routes information within the POP 120. Additionally, assignment of requests is performed by the switching fabric 340 using load balancing, round robin, random or another scheme to divide the processing between the edge servers 330 configured to perform a particular task. Where a request is received and it is determined that the initially assigned POP 120 is not close to the end user system 124, in networking terms, the switching fabric 340 can redirect or reroute the request to another POP 120. Alternatively, the assigned edge server 330 can rewrite the links in the web page to reference the POP 120 closer to the end user system 124.

Within each edge server 330, there are two processes that manipulate metric information. A edge log client 375 gathers information in a verbose way for the various instantiated processes running There can be a single edge log client 375 or several running on the edge server 330. The edge log client 375 records all the content delivered, processing performed, errors reported, requests made, etc. Several instantiated processes may report into the same or different log files. The log files can be divided by customer, account, sub-account, application, process, or any other structural breakdown.

The various log files from the edge servers 330 are gathered together by the POP log aggregator 380-*a* into larger log files. The accumulated log files are passed periodically or upon completion of an accumulation phase to a central log aggregator 380-*b*. The edge servers 330 can report their a log file to the POP log aggregator 380-*a* according to a schedule, when it reaches a certain size, when the edge server 330 utilization falls below a threshold, and/or upon request from the POP log aggregator 380-*a* or central log aggregator 380-*b*. The aggregated log file can be queried or processed for CDN billing or upon customer request. Reports can be distributed after processing of the log files.

Additionally within each POP 120, there is a POP query aggregator 370-*a*. As each edge server 330 is accumulating log information, an edge query client 350 is processing the log information to summarize it in a particular way as a data cube. Each line of the log file or a sampling of the lines of the log files is processed by the edge query client 350. The data cube from the processing are reported onto a messaging bus within the POP 120. The data cube is generally a summary of several lines of the log file, but could be a curtailment of a single line of the log file. Data cubes can generated according to a schedule, when the data cube reaches a certain size, when loading of the edge server 330 falls below a threshold, and/or upon request by the POP, regional or central query aggregator 370-*a*, 370-*b*, 360.

The POP query aggregator 370-*a* receives the data cubes from the messaging bus for each edge server 330. The data cubes are segregated by customer, account or sub-account. After aggregation, the aggregated data cube is put on a message bus to pass it to one of several regional query aggregators 370-*b*. The regional query aggregators 370-*b* are shown separate from the POP 120, but could be located in another POP 120 or any other part of the CDN 110. Multiple data cubes are reported from multiple POPs 120 to one of the regional query aggregators 370-*b*. Those data cubes are combined by the regional data aggregator 370-*b*.

Multiple data cubes are reported to the analytics hub 212 for final aggregation. The analysis hub 212 does final aggregation before it is passed to the customer. The central query aggregator receives the data cubes from a message bus. Reporting to clients of the data cube can be according to a schedule, periodically, when reaching a predetermined size, upon query and/or other trigger.

At each phase in the query aggregation, processing can be performed to create results that are a function of the information gathered. For example, the edge query client can process the lines of the log files with a language that allows processing URIs, variables, delivery metrics, etc. in any way imaginable using conditionals and loop instructions. The language can be compiled or executed at run time. For example, tracking of popular content could be performed for customer in a particular demographic or content having some similar characteristic could be tracked to record playing, pausing and stopping. Similarly, at any aggregation point 370, 360 further processing could be performed. For example, a regional query aggregator 370-*b* may track the POPs 120 receiving the most requests or compile the most popular content across all POPs.

Although this embodiment has two-stage query aggregation with regional query aggregators 370-*b*, other embodiments could not have the regional query aggregators 370-*b*. Data cubes from the POPs 120 are aggregated directly by the central query aggregator 360. As loading of the query infrastructure increases, the number of regional query aggregators 370-*b* could similarly be scaled to distribute processing. Some POPs 120 could avoid a local POP query aggregator 370-*a* by using a regional query aggregator 370-*b* in the first aggregation.

Figure 4A:
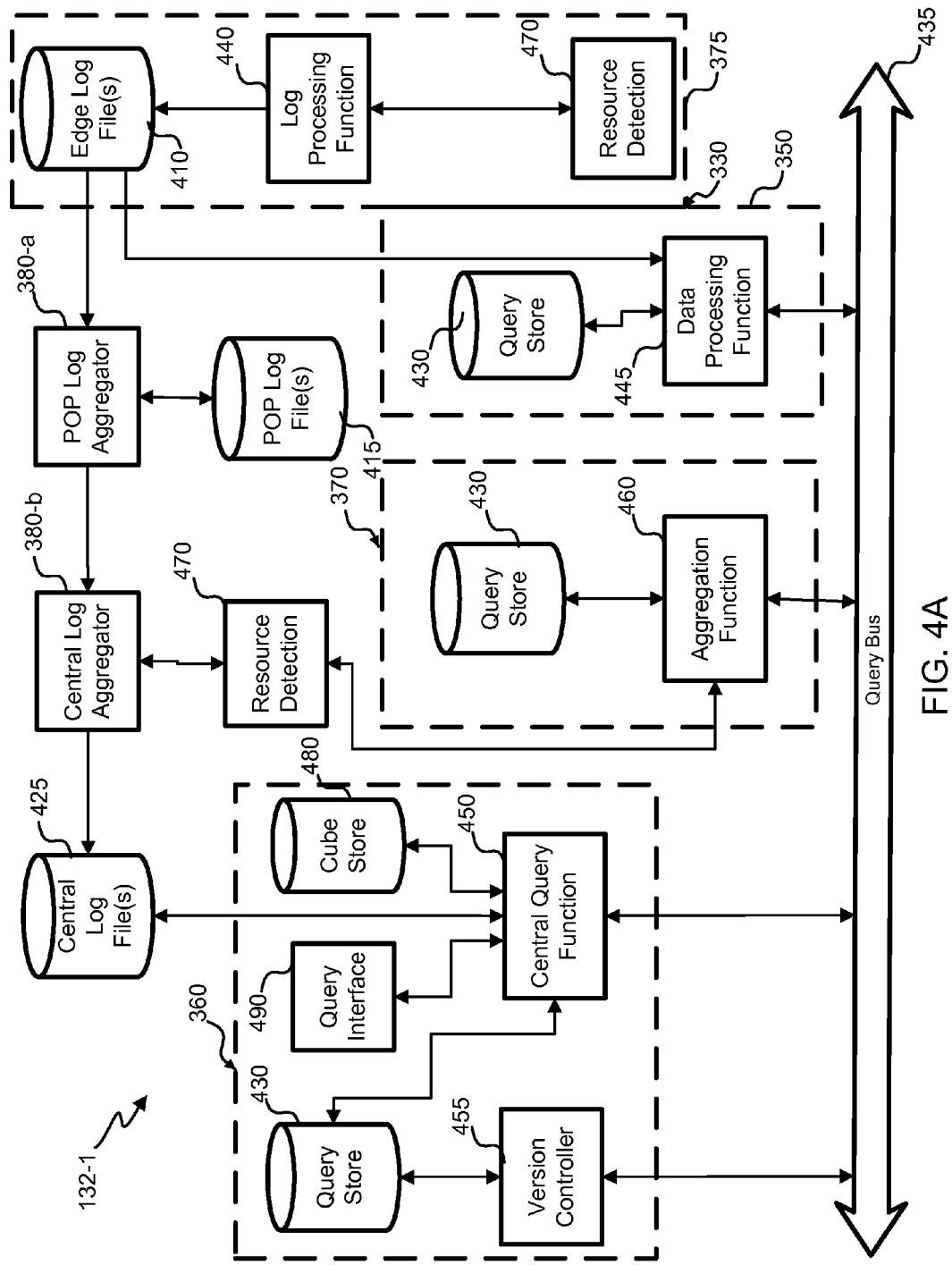
FIGS. 4A and 4B depict block diagrams of embodiments of analytics systems.

With reference to FIG. 4A, a block diagram of an embodiment of an analytics system 132-1 is shown. Although the various components are shown on the same figure, they are spread out between multiple locations typically. More specifically, the edge log client 375 and edge query client 350 are run on edge servers 330; the POP query aggregator 370 and POP log aggregator 380-*a* are in a particular POP 120; and the central query aggregator 360, central log aggregator 380-*b* and central log file(s) are located centrally or in one or more different POPs 120. A query bus 435 is used in this embodiment to pass data cubes of processed information to the various locations. Other embodiments could do point-to-point transmission to avoid using a query or message bus 435 for transmission of data cubes. The edge log files 410 are passed directly without using a message bus.

At each edge server 330, there are one or more edge log clients 375 that monitor delivery performance, resources consumption, sensor information, or any other parameter using a resource detection block 470. A log processing function 440 records the gathered resource detection 470 in one or more edge log files 410. The resource detection 470 can be content requests (e.g., URI, requesting IP address, delivery latency, etc.), streaming information (codec, delivery speed, content object portions delivered, QoS, etc.), server health or utilization (memory consumption, processor consumption, performance of instantiation, temperature, hard drive utilization, etc.), or any other parameter that can be monitored by the edge server 330. Entries are made into the edge log file 410 for the gathered information.

Periodically, the edge log files 410 are reported to a POP log aggregator 380-*a* that combines them from the multiple edge servers 330 in the POP 120 to form POP log files 415. There could be regional log aggregators that combine POP log files 415 from multiple POPs 120, but not in this embodiment. The POP log aggregators 380-*a* report their POP log files 415 to a central log aggregator 380-*b* for combining Finally, the log file information is stored as central log files 425. Edge log files 410 are arranged sequentially and gather predetermined values, but could be aggregated into a central database or distributed database in other embodiments. Billing, customer analysis and query can be performed against the central log files 425. In this embodiment, additional log file information is gathered at intermediate stages. The central log aggregator 380-*b* does additional resource detection 470. Anywhere in the CDN 110 additional resource detection 470 could be performed to augment log files and/or process those log files into data cubes as part of the query process.

Query processing takes a similar, but parallel path throughout the CDN 110 in this embodiment. As log files 410 have information added, the data processing function 445 within the edge query client 350 applies queries to the edge log files 410. A query store 430 holds the queries for various customers, accounts, sub-accounts, etc. The data processing function 445 takes one or more lines from the edge log file 410 and applies one or more relevant queries to create a corresponding number of data cubes. The data processing function 445 parses the queries, which are structured much like a programming language to allow the data cube to be any function of the edge log file 410 imaginable. The data cubes are placed on the query bus 435 upon creation, but other embodiments could accumulate results in the data cube until a bin size is reached. The bin size could be defined by a data size taken from the log file, a data size in the data cube, a memory size consumed by the data cube, a time period, or other division.

This embodiment includes a query aggregator 370 that could be for a particular POP 120 or a regional query aggregator 370 assigned to a number of POPs 120. Data cubes gathered from the edge servers 330 are combined according to the query from the query store 430. Additional log information can be injected into the query processing such that the aggregation function 460 is both processing existing data cubes and formulating new ones with an integral data processing function 445 (not shown). The query may simply aggregate data cubes together at this stage or could combine the cubes according to some function into a new cube. For example, a combination of several data cubes could be data cube that identifies the fastest hundred download speeds found in the several data cubes. In any event, the data cube is passed immediately, periodically or upon reaching some threshold to the query bus 435.

A central aggregator 360 performs the final processing on the data cubes gathered from one or more query aggregators 370, one or more edge query clients 350 and/or log files processed centrally in various embodiments. A query interface 490 receives from customers, accounts or sub-accounts queries; and could be a web page, API, message bus, and/or other interface mechanism. Any possible formulation of query is supported that can process the log information. Any number of queries can be specified for formulation against the same log file information. The query may be different depending on whether new log information is being processed and/or data cubes are being combined. A compiler can take a single query and revise it according the number of gathering points and aggregation points that will be used. The compiler can warn of queries that are likely to result in unexpectedly large data cubes or that might fail to result in useful information for whatever reason.

The queries can be complex multi-step functions much like a programming language and the query interface could allow editing, debugging and compilation of the instructions or commands. Additionally, queries could be run against central log files 425 to give test results for historical information. Different pricing models could exist for the different impact a desired query would have on the reporting infrastructure. For example, large data cubes reported frequently could have cost that varies according to size. Computationally intensive queries could have cost that varies according to computing resources used in processing cycles, memory or other storage, for example. The query interface 490 can provide a cost estimate. The customer can bound the cost or data cube size according to need. Should a query cross a bandwidth, size, computation, memory, etc. threshold, the query could be killed CDN-wide. In this embodiment, any edge server 330 or query aggregator 370, 360 can send a message over the query bus 435 to cause all the distributed processing of the relevant query or queries to halt. In this way, any misbehavior of the query can quickly cause processing to stop in this embodiment.

Once the query is received and potentially vetted, the central query function 450 may compile or partially compile the query. For various topologies of aggregation, the query may be broken down to different sets of instructions applicable to edge servers 330 or aggregators 370, 360. The processed queries are loaded into the query store 430 before propagation out to the other query stores 430 in the CDN 110.

A version controller 455 takes those queries and propagates them out on the query bus 435 to the various aggregation and edge servers 370, 330. Each query has a version number and a receiving server will replace an older version of the query with a newer one. The server will report back to the version controller 455 the version it has loaded for each query. Some embodiments send an entire set of queries out periodically to replace all queries. The receiver would report the version of the entire set of queries last updated across-the-board. The version controller 455 knows the state of the queries held in each query store 430 system-wide. Out-of-date queries can be updated.

Data cubes include information to identify the query and the version of query used to create the data cube. Data cubes created by different versions of the query can be ignored if different from the version being used by the aggregator 360, 370. When an out-of-date data cube is received, the version controller 455 is notified such that remedial action is taken to replace the out-of-date query. Additionally, the data cube provides providence that allows correlating the processed information back to the log file used to create it along with the edge server and aggregator 370 used.

Returning back to the data cube formulation process, the central query function 450 receives data cubes from all the query aggregators 370. Those data cubes are combined and/or processed prior to storing the data cube onto the cube store 480. The customers can retrieve the final data cube from the cube store 480 or make inquiries against the data cube through the query interface 490. Some embodiments report out the data cubes periodically, when they reach a certain size or when triggered by some other event.

Figure 4B:
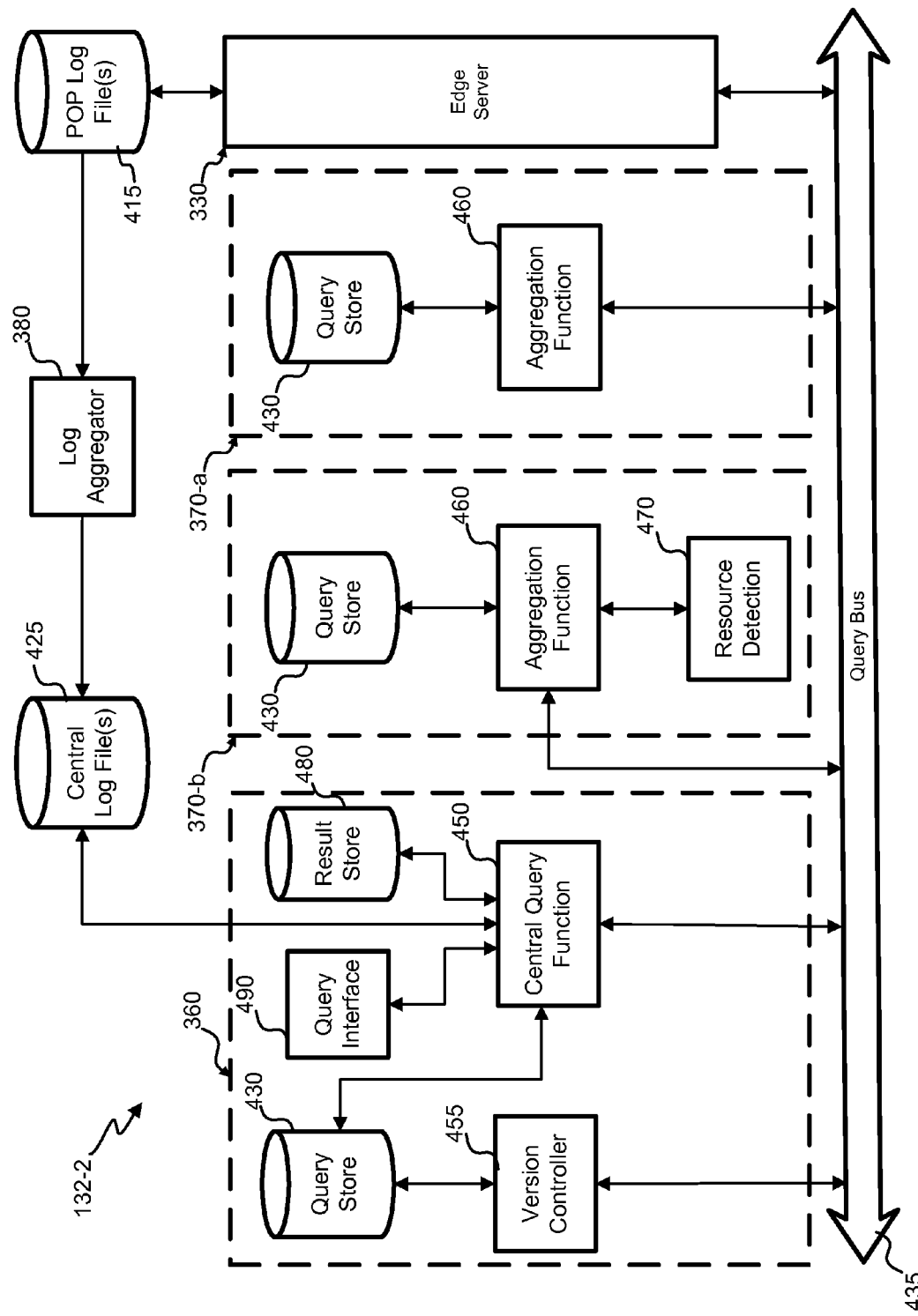

Referring next to FIG. 4B, a block diagram of another embodiment of an analytics system 132-2 is shown. This embodiment has a different arrangement than the embodiment of FIG. 4A. The embodiment in FIG. 4B, data cubes are aggregated at two levels for a particular edge server 330. A POP query aggregator 370-*a*, aggregates within the POP 120 for one or more edge servers 330. In this embodiment, the regional query aggregator 370-*b* gathers data cubes from a number of POPs 120 or even edge servers 330. Additionally, the regional query aggregator 370-*b* in this embodiment includes optional resource detection 470 to create new data cubes that are combined with data cubes gathered from elsewhere. The central query aggregator 360 in this embodiment does not also include resource detection, but could generate new data cubes in other embodiments. Log aggregation is performed with a single central log aggregator 380 in this embodiment.

Figure 5:
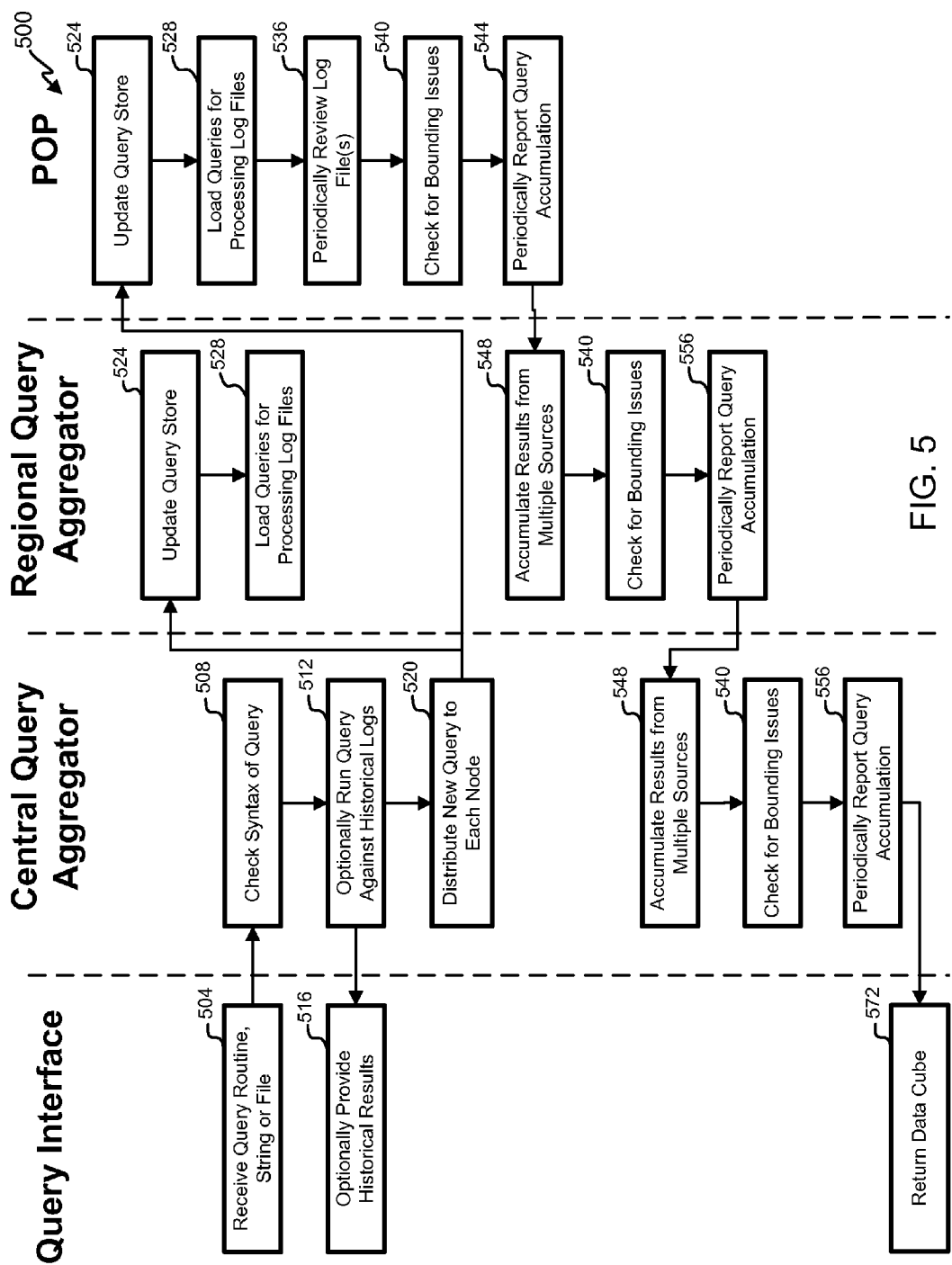
FIG. 5 illustrates a swim diagram of an embodiment of a process for gathering analytic information.

With reference to FIG. 5, a swim diagram of an embodiment of a process 500 for gathering analytic information is shown. The depicted portion of the process begins in block 504 where the query is received with the query interface 490 in the form of a string, function with multiple instructions, file containing a string or function, or manually entered information from standard query options or query customization screens. A central query aggregator 360 includes a central query function 450 that checks the syntax of the received query. Optionally, the customer can test the query against historical log information to see what would be produced by the process if it had been run in real time.

The new or revised query is distributed in block 520 to the various query stores 430. The query stores 430 are updated in the two blocks 524 in a regional query aggregator 370-*b* and each POP query aggregator 370-*a* for each of the POPs 120. Also the queries are loaded from the query stores 430 in the regional query aggregators 370-*b* and POP query aggregator 370-*a* in the two blocks 528. Notably, there are many POPs 120 so the blocks in the POP portion of the swim diagram are performed at many different POPs 120 in parallel or overlapping in time. Additionally, there are potentially many regional query aggregators 370-*b*.

Moving from block 528 in the POP to block 536, the edge log file(s) 410 are interrogated against the relevant queries in block 536. As queries are processed, bounding issues are checked in block 540. Bounding issues could be that the data cube is too large, consuming too much processing or memory resources, or overloading any other consumable resource. Should any query consume resources beyond a predetermined threshold, a message is sent on the query bus 435 to kill the query such that it is no longer performed until the customer can purchase higher thresholds or revise the query. A message is sent to the customer when this happens and alerts are provided on the query interface such that the customer can perform remedial action.

Periodically, as gathered, or when reaching a size threshold, the accumulated data cube is reported upstream to a regional query aggregator 370-*b* in block 544. The regional query aggregator 370-*b* receives a data cube from the POP 120 and other POPs 120 in block 548. When combining data cubes for a query with other data cubes, there can be bounding issues so the regional query aggregator 370-*b* checks the combined data cube to see if predetermined resource thresholds are crossed in block 540. Should that be the case, a message is sent on the query bus 435 back to the version controller 455 who updates the query across the CDN 110. Other embodiments could have the regional query aggregator 370-*b* or aggregation function 460 send a message to all others in a singlecast or a broadcast fashion using the query bus 435, another message bus or the network 204.

The central query aggregator 360 performs block 548 to accumulate, block 540 to possibly kill a query and block 556 to report the accumulated data cube. The final data cube is held in the result store. The customer can define how often data cubes are reported in block 572. At the preference of the customer, the data cube many not be reported outside the CDN 110 instead being held for viewing, processing or downloading from the query interface 490. The customer can further query, process and/or parse the data cube while it resides in the cube store 480. In this way, log information is processed in multiple locations and accumulated through a series of accumulation points in a defined hierarchy such that each node knows the next higher node in that hierarchy.

Figure 6:
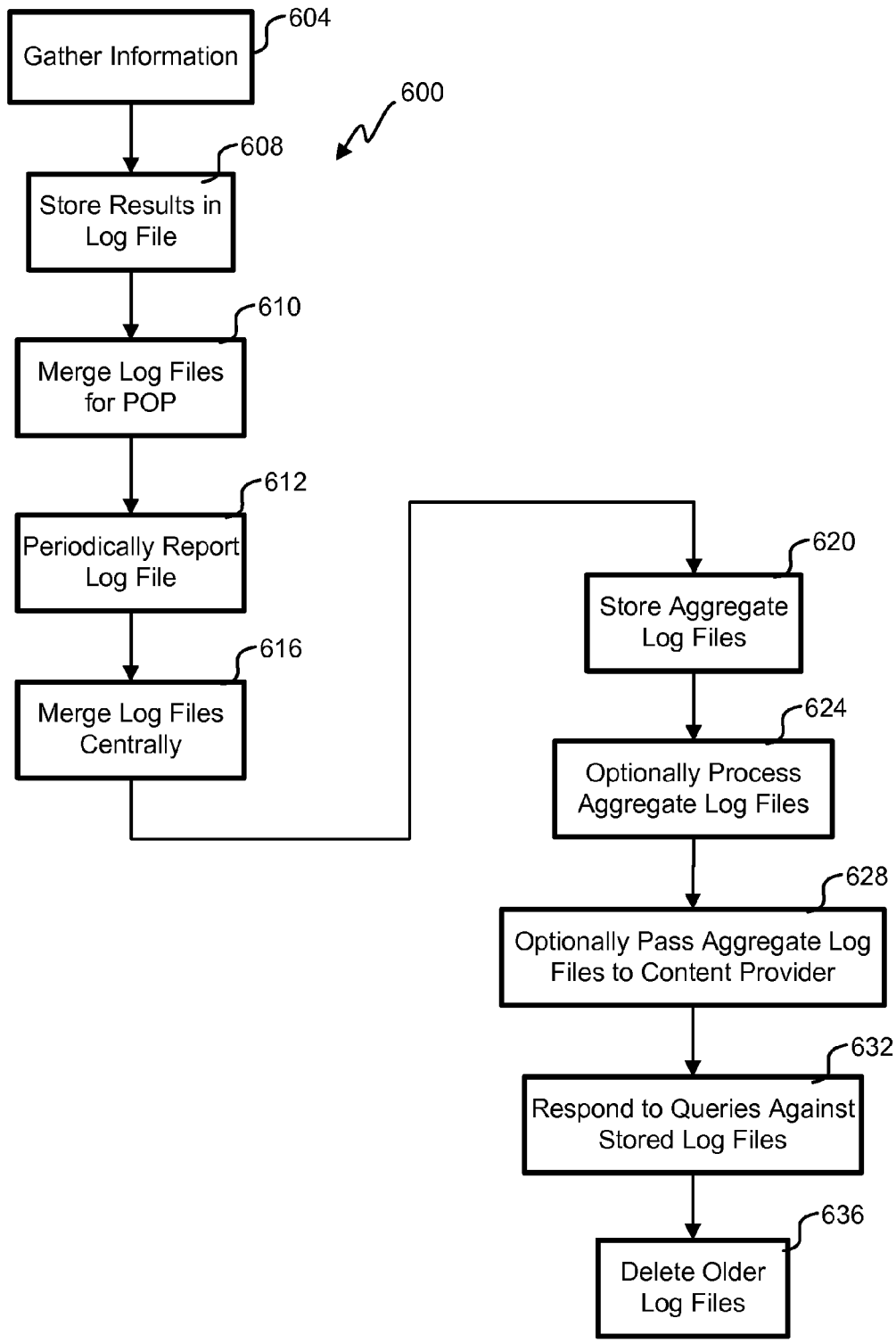
FIG. 6 illustrates a flowchart of an embodiment of a process for gathering analytics information.

Referring next to FIG. 6, a flowchart of an embodiment of a process 600 for gathering log information is shown. Log information is gathered in many different locations within the CDN 110. The various log files are aggregated and combined according to some scheme. In this embodiment, a timestamp is used for each log entry line. Combining log files includes arranging all lines chronologically. The depicted portion of the process 600 begins in block 604 where the resource detection 470 is performed. In block 608, the results from the resource detection 470 is stored. Storage may happen periodically or after a number of lines of log are gathered. Periodically, the edge log files 410 are sent to an upstream POP log aggregator 380-*a* for combining in block 610.

POP log files 415 are sent from each POP 120 to a central log aggregator 380-*b* in this embodiment. Other embodiments could have regional log file aggregators arranged in any hierarchy to distribute the aggregation processing. In block 616, the central log aggregator 380-*b* merges the log files centrally 616. Log files 410, 415, 425 can be created for use within the CDN 110 and/or customer use. Different customers log information can be kept separate or anonymized if shared in some way. The aggregated log files are stored in block 620. Optional processing can be performed on the aggregated central log files 425 in block 624 to determine customer billing, divide log information according to customer, or any other custom report.

Some customers may want the log files or portions thereof relevant to their account with the CDN 110 that is passed to the customer in block 628. Additionally, the customer can interact with the query interface 490 to query the log files or request other processing in block 632. Log files tend to huge in size. Older, unlikely to be requested, and/or less popular log files or portions thereof are deleted periodically 636. For example, the CDN 110 may store the last month of log files unless a customer pays for additional storage.

Figure 7A:
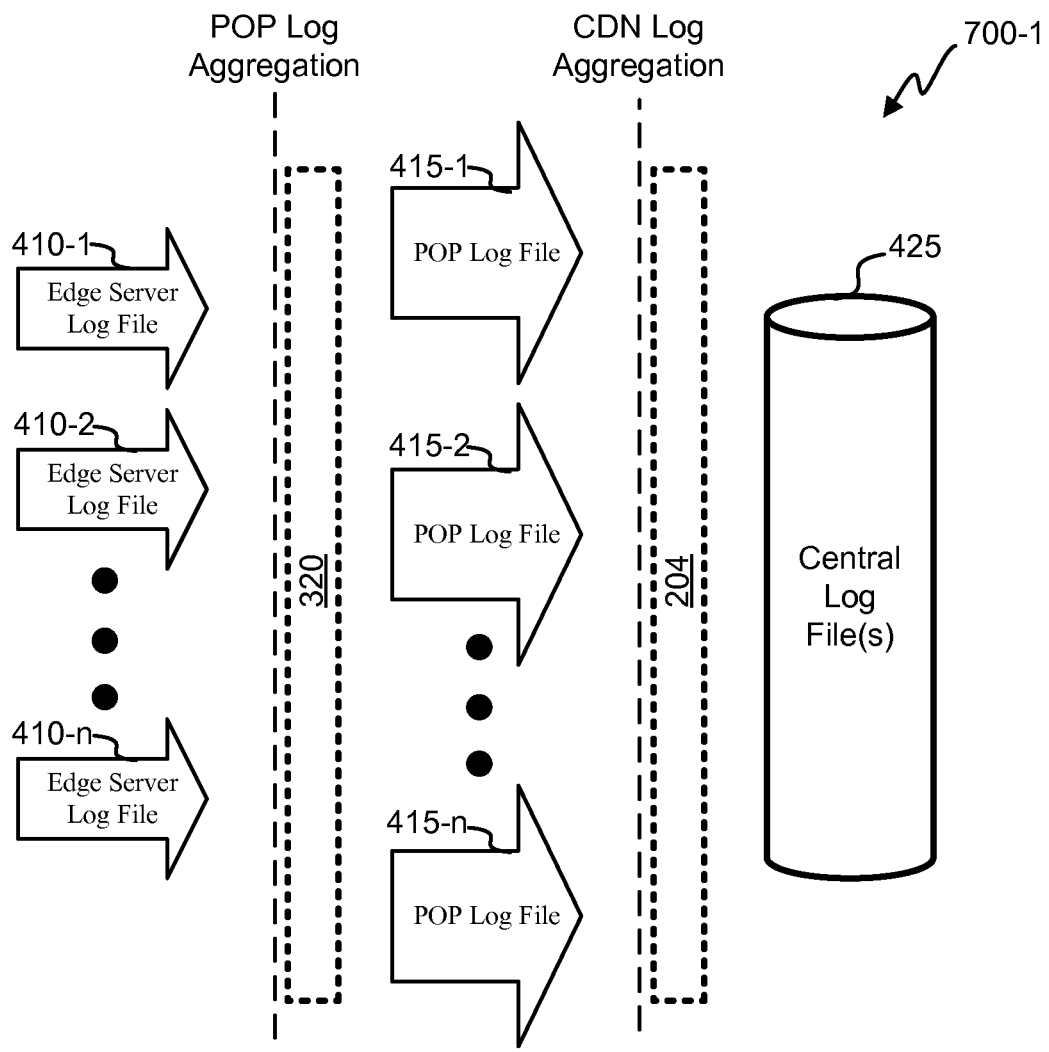
FIGS. 7A and 7B illustrate diagrams of embodiments of a data flow for collecting logs of analytics information.

With reference to FIG. 7A, a diagram of an embodiment of a data flow 700-1 for collecting logs of analytics information is shown. This data flow 700-1 illustrates how multiple edge server log files 410 are gathered in each POP 120. The POP log aggregator 380-*a* takes the edge server log files 410 within the same POP 120 and combines them into a POP log file 415 before passing the POP log file 415 upstream using the network 204 to CDN log aggregation 380-*b*. After the various POP log files 415 are combined by the CDN log aggregation 380-*b*, the result is stored as a central log file 425. There can be any number of central log files 425 that are accumulated and processed in parallel.

Figure 7B:
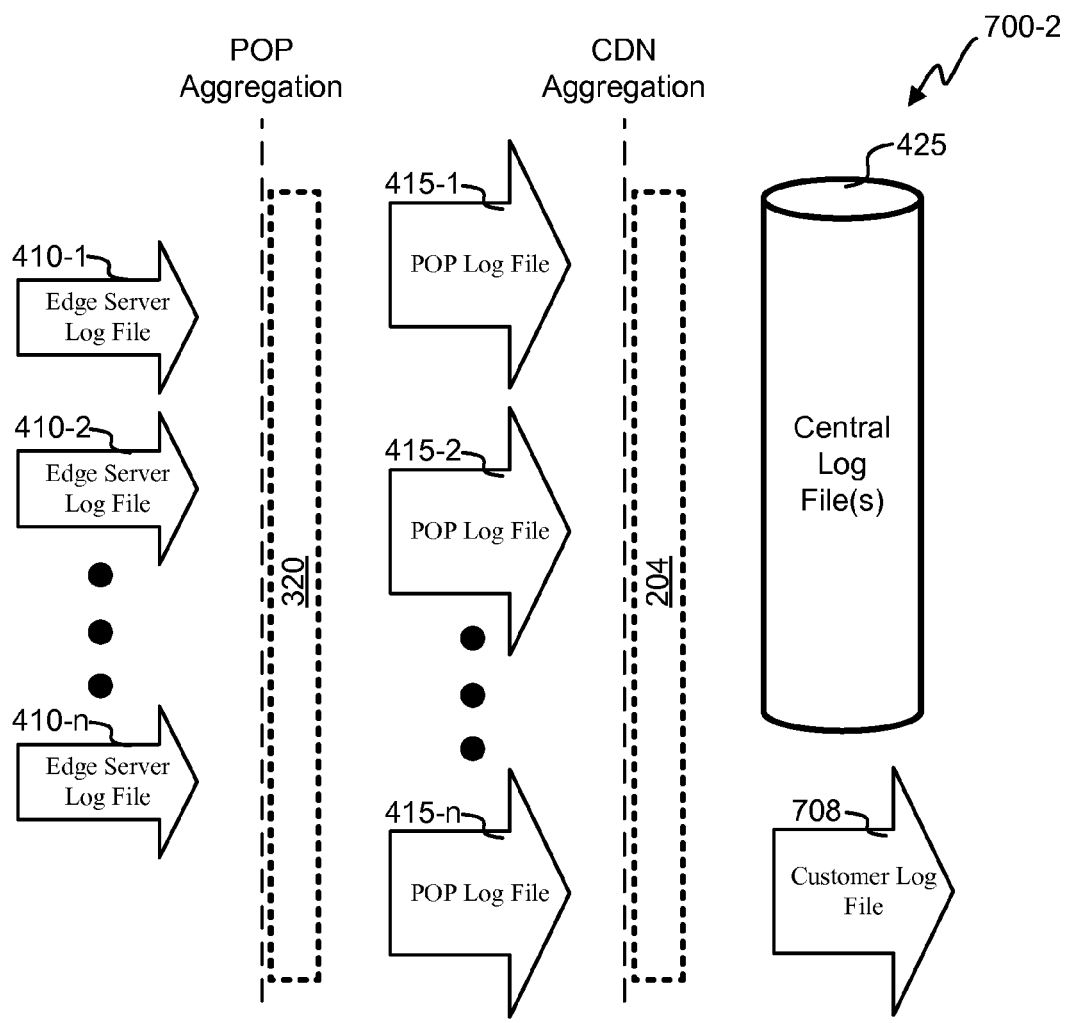

Referring next to FIG. 7B, a diagram of another embodiment of a data flow 700-2 for collecting logs of analytics information is shown. This embodiment is similar to that of FIG. 7A, except a customer log file 708 is sent from the central log files 425 to a location specified by the customer. The customer log file 708 could be sent periodically, at a predetermined time or times, when invoices are sent, upon customer request, when the customer log file 708 reaches a certain size or upon triggering of an event specified by the customer. For example, the customer log file 708 could be sent when the content delivery latency reaches a threshold on average. The customer log file 708 could be analyzed by the customer for whatever purpose.

Figure 8A:
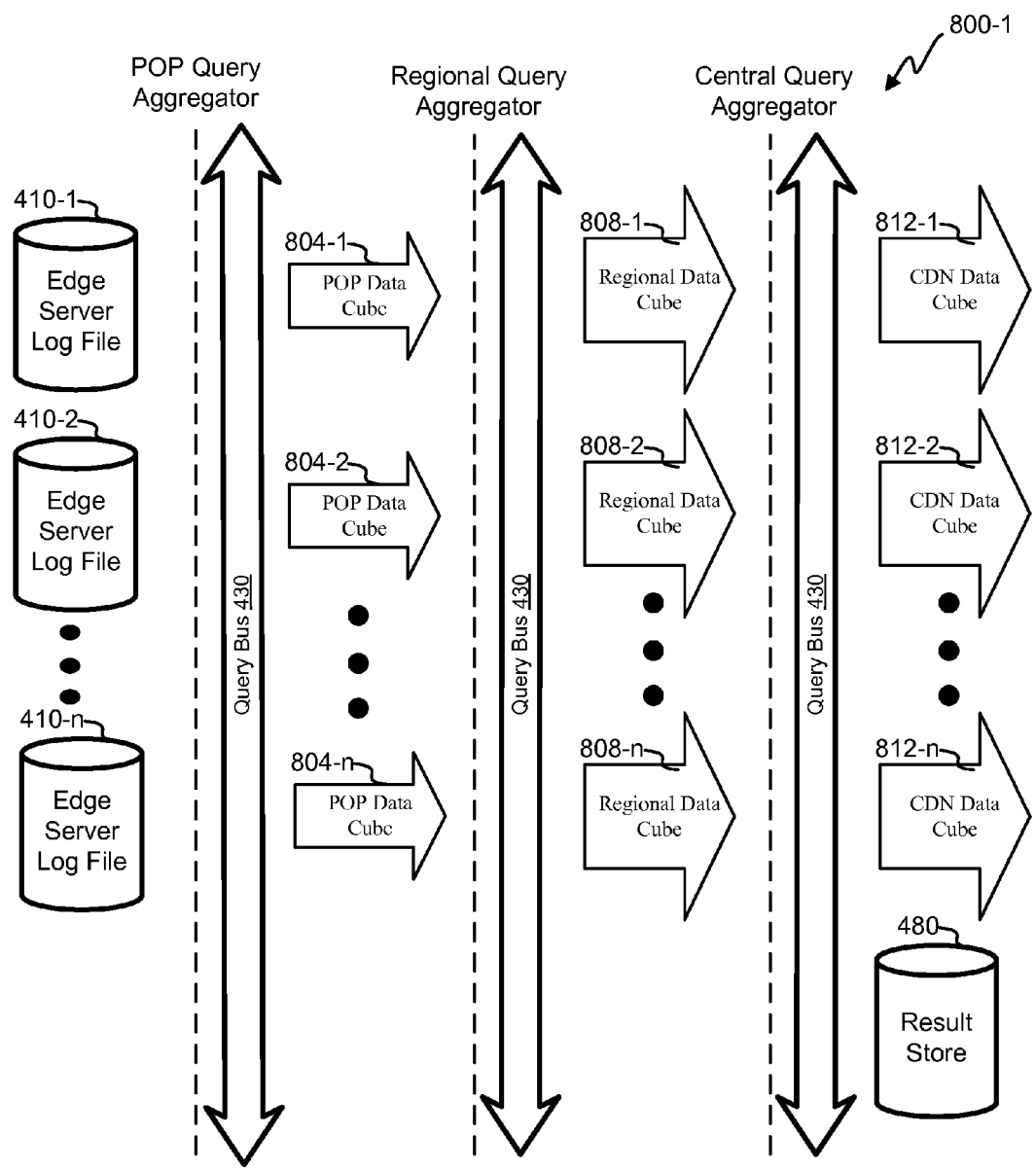
FIGS. 8A and 8B illustrate diagrams of embodiments of a data flow for collecting data cubes of analytics information.

With reference to FIG. 8A, a diagram of an embodiment of a data flow 800-1 for collecting data cubes of analytics information is shown as query information is gathered throughout the CDN 110 using one or more query or message bus 435. An POP query aggregator 370-a takes information from a number of edge server log files 410 each maintained by a respective edge server 330 to produce an POP data cube 804. A regional query aggregator 370-b takes the POP data cubes 804 from one or more POPs 120 to aggregate them into regional data cube 808. There can be one or more regional query aggregators 370-b that each produce a regional data cube 808 in this embodiment.

The final combination of regional data cubes 808 is performed by a central query aggregator 360. There are data cubes being combined for each customer query. The central query aggregator 360 produces a CDN data cube 812 for each customer query. Those CDN data cubes 812 can be sent to their respective customer servers or can be stored for later retrieval or processing in a result store 480. At each aggregator 370-a, 370-b, 360, additional data cubes can be formulated and included into the aggregation done at that node.

Figure 8B:
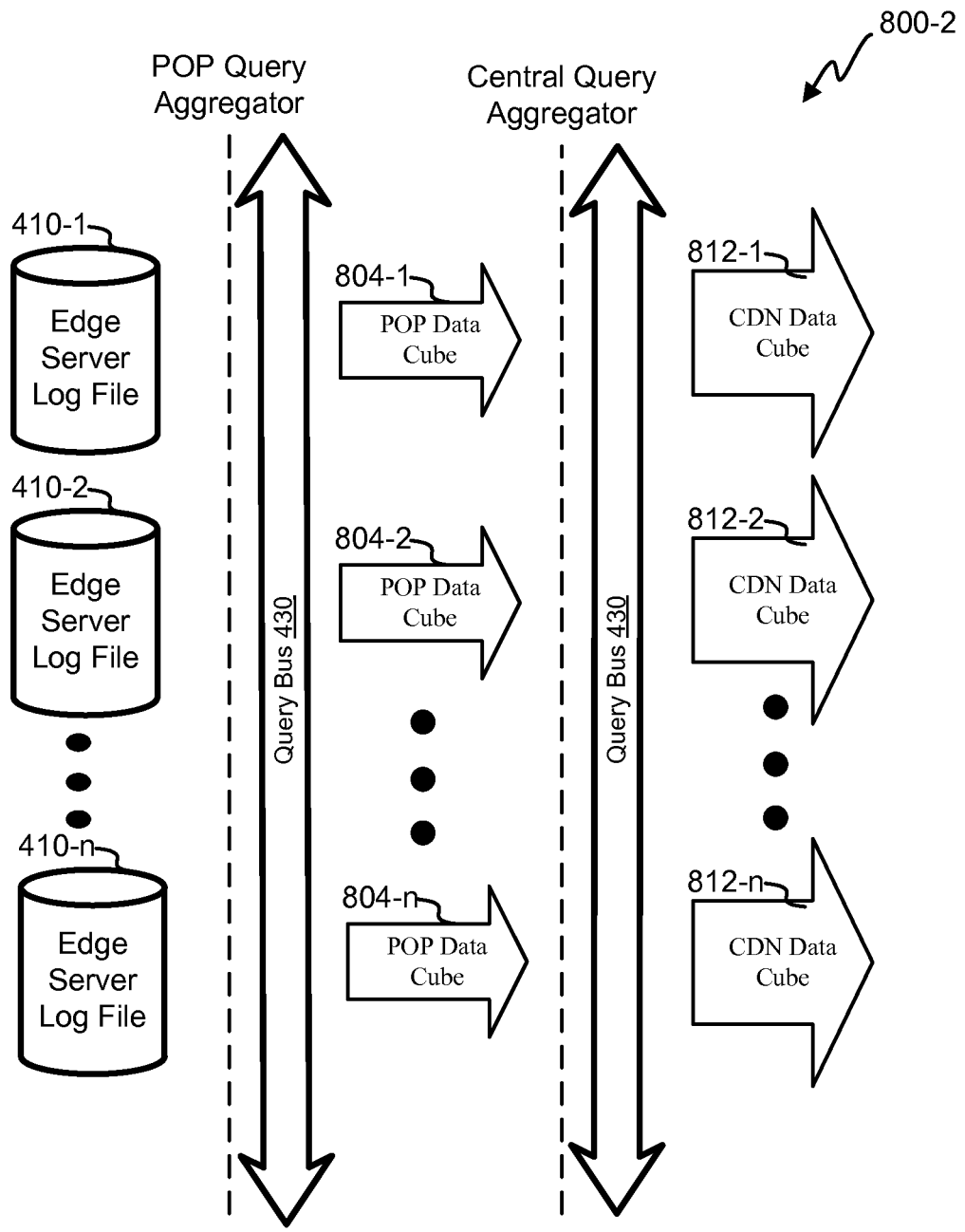

Referring next to FIG. 8B, a diagram of another embodiment of a data flow 800-2 for collecting data cubes of analytics information is shown. This embodiment differs from that of FIG. 8A in that there is no intermediate regional query aggregator 370-b. POP data cubes 804 are formulated by the POP query aggregator 370-a and passed directly to the central query aggregator 360 using the query bus 435 for creation of a CDN data cube 812 for each query. In this embodiment, the CDN data cubes 812 are not retained, but passed back to a server specified by the customer.

Figure 9:
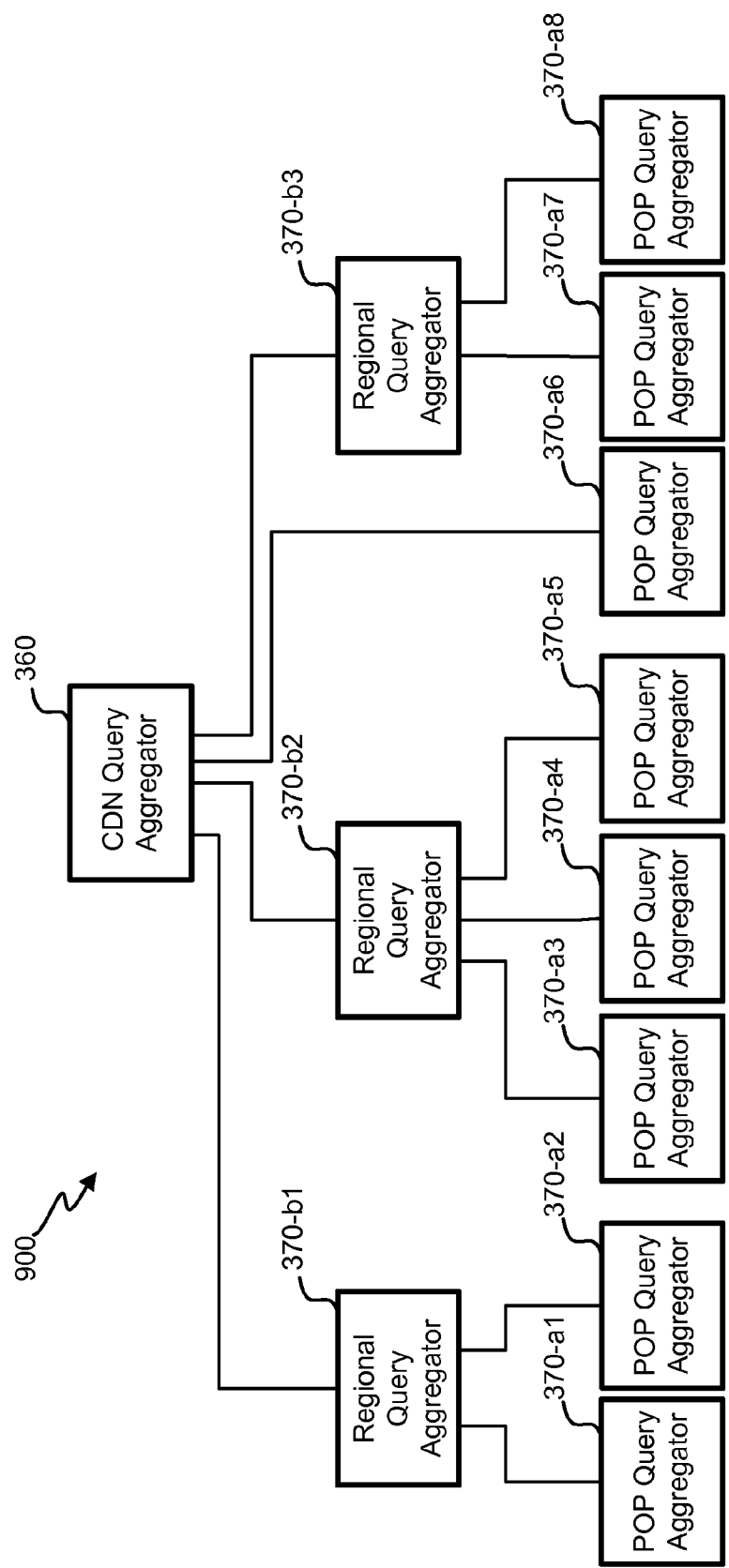
FIG. 9 illustrates a diagram of an embodiment of a hierarchy depicting the gathering analytics information.

With reference to FIG. 9, a diagram of an embodiment of a hierarchy 900 defining the arrangement of aggregation nodes 360, 370-a, 370-b for gathering analytics information is shown. The lines between aggregators 360, 370-a, 370-b show the flow of data cubes upstream. Depending upon loading, those lines can be rearranged to redefine flow. When a particular node 360, 370-a, 370-b becomes overloaded, upstream aggregators can be reassigned to another aggregator 360, 370-a, 370-b at the same level in the hierarchy 900. For example, the first regional query aggregator 370-b1 receives POP data cubes 804 from the first and second POP query aggregators 370-a1, 370-a2, but should it become overloaded on of the first and second POP query aggregators 370-a1, 370-a2 could be reassigned to the second regional query aggregators 370-b2.

Load balancing could also be used to allocate cube processing between the levels in the hierarchy in other embodiments. For example, lines could move as load is not evenly matched. Other embodiments could have each aggregator cycle through the possible aggregators at the next highest level in the hierarchy randomly, in round robin fashion or according to another scheme to spread out the loading.

The hierarchy 900 can be explained with an example. The CDN query aggregator 360 gathers regional data cubes 808 from three regional query aggregators 370-b1, 370-b2, 370-b3. The first regional query aggregator 370-b1 gathers POP data cubes 804 from a first and second POP query aggregators 370-a1, 370-a2. The second regional query aggregator 370-b2 gathers POP data cubes 804 from a third, fourth and fifth POP query aggregators 370-a3, 370-a4, 370-a5. The third regional query aggregator 370-b3 gathers POP data cubes 804 from a sixth, seventh and eighth POP query aggregators 370-a6, 370-a7, 370-a8. Although this embodiment has three levels in the hierarchy, other embodiments could have more or less to distribute processing across the CDN 110. Each aggregator 360, 370-a, 370-b is in a different location in this embodiment, but in some embodiments some of the aggregators 360, 370-a, 370-b could be in the same POP or geographic location.

Figure 10:
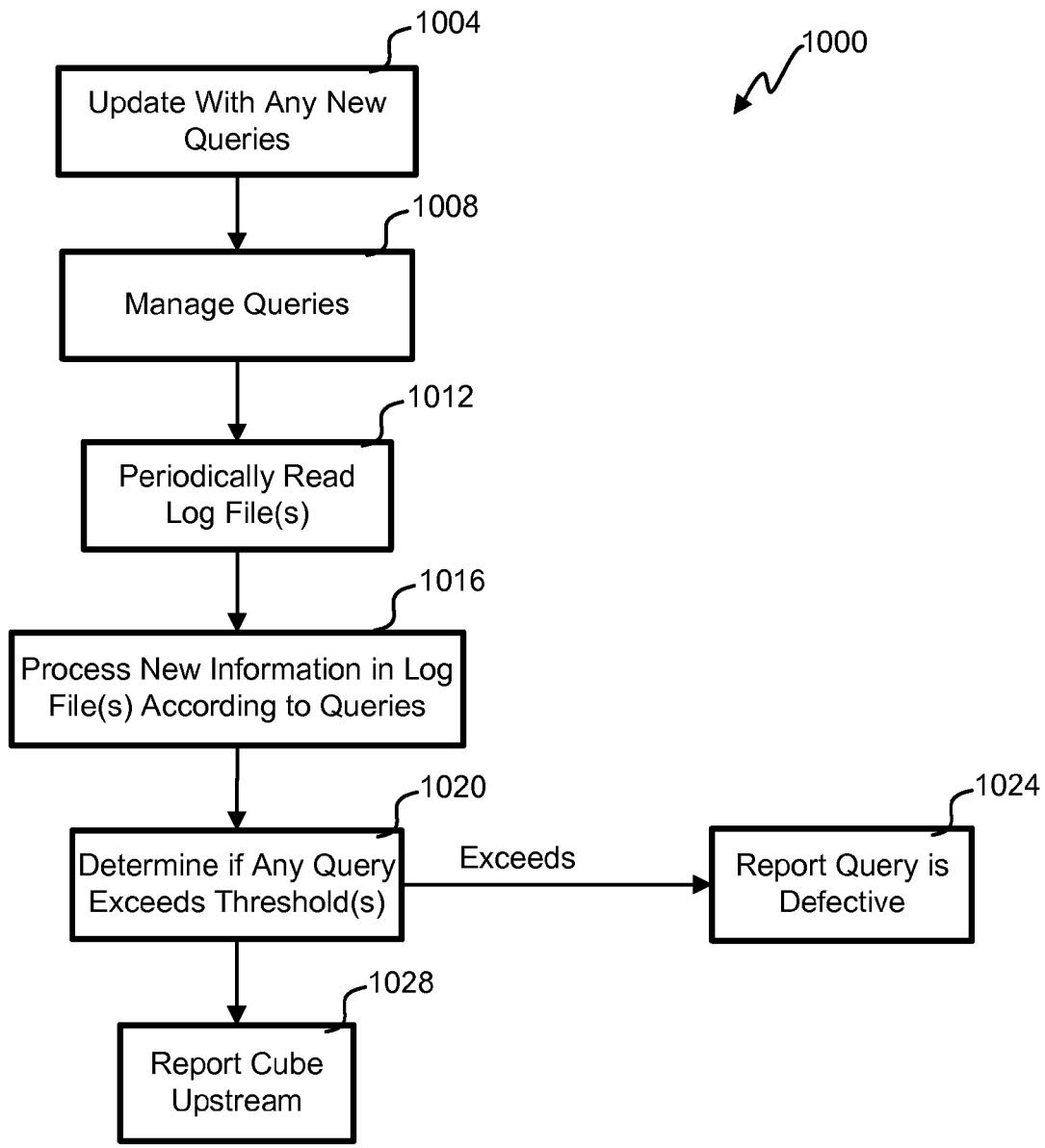
FIG. 10 illustrates a flowchart of an embodiment of a process for generating a data cube with a data processing function and potentially killing a renegade query.

Referring next to FIG. 10, a flowchart of an embodiment of a process 1000 is shown for generating a data cube with a data processing function 445 and potentially killing a renegade query. The depicted portion of the process begins at block 1004 where the query store 430 is sent any new queries. Killed, updated or obsolete queries are updated in block 1008. The updating and managing queries is choreographed by the version controller 455. The current state of every query store 430 is known by the version controller 455. Only data cubes produced with the same version of a particular query are aggregated in this embodiment.

According to some scheme, the log file(s) relevant to a query is read to gather unprocessed information in block 1012. The log files can be read as the data processing function 445 cycles through the various queries. In different embodiments, the data processing function 445 can handle a processing a number of queries in parallel. In block 1016, the log file(s) are processed according to the query. In block 1020, the resource consumption of performing the query is analyzed. Specific thresholds can be configured for memory, processing power, storage, etc. that are monitored to immediately know when a threshold is crossed. Where no threshold is crossed, processing completes on the data cube which is reported upstream in block 1028 according to the hierarchy 900.

Should any threshold be crossed, the query is killed by reporting the defective query over the query bus 435. Any listener on the query bus 435 can read the defective query in this embodiment to allow for immediate halting of the query on all nodes producing or processing data cubes. In other embodiments, the errant query could be reported to the version controller 455 who would then kill the query. In any event, the processing of the query soon stops across the entire CDN 110.

Although this embodiment processes each line of relevant log files, other embodiments could rely on sampling. The sampling could skip some lines in the log files and estimate the missing information statistically. Other embodiments could discard some data cubes or have select edge servers 330 stop gathering log information. The amount of data discarded in favor of sampling could be scaled up or down according to the loading of the various nodes. Where sampling is used, a quality factor is introduced to reflect how reliable the statistical sampling is for a given data cube.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) having a plurality of points of presence (POPs) to deliver content for a plurality of customer accounts, comprising:
   one or more processors for executing instructions to:
      receive a query from one of the customer accounts to gather analytics information related to delivery of content for the one of the customer accounts;
      process the query into an analytics query to gather the analytics information;
      gather a first part of the analytics information from a first POP of the plurality of POPs;
      process the first part of the analytics information into one or more data cubes;
      pass the one or more data cubes along a data bus;
      gather a second part of the analytics information from a second POP of the plurality of POPs;
      add the second part of the analytics information to the one or more data cubes;
      determine that the one or more data cubes reach a predetermined threshold;
      originate a message to shut down gathering of the second part of the analytics information; and
      send the message to two or more of the plurality of POPs; and
   one or more storage media for retaining the instructions.

2. The CDN having a plurality of POPs to deliver content for a plurality of customer accounts as recited in claim 1, wherein the first part of the analytics information gathered from the first POP is gathered by an edge server within the first POP.

3. The CDN having a plurality of POPs to deliver content for a plurality of customer accounts as recited in claim 1, wherein the one or more processors that execute the instructions that determine that the one or more data cubes reach a predetermined threshold, are within the first POP.

4. The CDN having a plurality of POPs to deliver content for a plurality of customer accounts as recited in claim 1, wherein the message to shut down gathering of the second part of the analytics information is sent through at least one server.

5. The CDN having a plurality of POPs to deliver content for a plurality of customer accounts as recited in claim 1, wherein the message to shut down gathering of the second part of the analytics information is sent according to a hierarchy of servers.

6. The CDN having a plurality of POPs to deliver content for a plurality of customer accounts as recited in claim 1, wherein the predetermined threshold is a measure of an amount of memory consumed by the one or more of the data cubes.

7. The CDN having a plurality of POPs to deliver content for a plurality of customer accounts as recited in claim 1, wherein there are a plurality of predetermined thresholds that have differences among the plurality of customer accounts.

8. The CDN having a plurality of POPs to deliver content for a plurality of customer accounts as recited in claim 1, wherein the analytics information relates to addresses where the content was delivered for the one of the customer accounts.

9. A method for managing aggregation of one or more data cubes within a content delivery network (CDN) having a plurality of points of presence (POPs) that deliver content for a plurality of customer accounts, comprising utilizing a processor of the CDN for:
receiving a query from one of the customer accounts to gather analytic information related to delivery of content;
processing the query into a first analytics query, wherein the first analytics query identifies analytics information;
gathering a first part of the analytics information from a first POP of the plurality of POPs;
processing the first part of the analytics information into one or more data cubes;
passing the one or more data cubes along a data bus;
gathering a second part of the analytics information from a second POP of the plurality of POPs;
adding the second part of the analytics information to the one or more data cubes;
determining that the one or more data cubes reach a predetermined threshold;
originating a message to shut down gathering of the second part of the analytics information; and
sending the message to two or more of the plurality of POPs.

10. The method for managing aggregation of one or more data cubes within CDN having a plurality of POPs that deliver content for a plurality of customer accounts as recited in claim 9, further comprising utilizing the processor for relaying the notification from the first POP to the remainder of the plurality of POPs.

11. The method for managing aggregation of one or more data cubes within a CDN having a plurality of POPs that deliver content for a plurality of customer accounts as recited in claim 9, wherein the predetermined threshold is a measure of memory consumption on an edge server of one of the plurality of POPs.

12. The method for managing aggregation of one or more data cubes within a CDN having a plurality of POPs that deliver content for a plurality of customer accounts as recited in claim 9, wherein the predetermined threshold is a measure of processing resources consumed on an edge server of one of the plurality of POPs.

13. The method for managing aggregation of one or more data cubes within a CDN having a plurality of POPs that deliver content for a plurality of customer accounts as recited in claim 9, wherein a plurality of predetermined thresholds are related to respective ones of the plurality of customer accounts, and at least two of the plurality of predetermined thresholds are different from one another.

14. The method for managing aggregation of one or more data cubes within a CDN having a plurality of POPs that deliver content for a plurality of customer accounts as recited in claim 9, wherein at least one of the first and second analytics information relates to content delivery for the one of the customer accounts.

15. The method for managing aggregation of one or more data cubes within a CDN having a plurality of POPs that deliver content for a plurality of customer accounts as recited in claim 14, wherein the at least one of the first and second analytics information relates to addresses for content delivered for the one of the customer accounts.

16. A computer readable device with instructions for managing aggregation of one or more data cubes within a content delivery network (CDN) having a plurality of points of presence (POPs) that deliver content for a plurality of customer accounts, comprising computer-executable code for:
receiving a query from one of the customer accounts to gather analytic information related to delivery of content;
processing the query into a first analytics query, wherein the first analytics query identifies analytics information;
gathering a first part of the analytics information from a first POP of the plurality of POPs;
processing the first part of the analytics information into one or more data cubes;
passing the one or more data cubes along a data bus;
gathering a second part of the analytics information from a second POP of the plurality of POPs;
adding the second part of the analytics information to the one or more data cubes;
determining that the one or more data cubes reach a predetermined threshold;
originating a message to shut down gathering of the second part of the analytics information; and
sending the message to two or more of the plurality of POPs.

17. The computer readable device with instructions for managing aggregation of one or more data cubes within a CDN having a plurality of POPs that deliver content for a plurality of customer accounts as recited in claim 16, further comprising computer-executable code for relaying the notification from the first POP to the remainder of the plurality of POPs.

18. The computer readable device with instructions for managing aggregation of one or more data cubes within a CDN having the plurality of POPs that deliver content for the plurality of customer accounts as recited in claim 16, wherein the predetermined threshold is one of a measure of memory consumption on an edge server of one of the plurality of POPs and a measure of processing resources consumed on an edge server of one of the plurality of POPs.

19. The computer readable device with instructions for managing aggregation of one or more data cubes within a CDN having the plurality of POPs that deliver content for the plurality of customer accounts as recited in claim 16, wherein there are a plurality of predetermined thresholds that have differences among the plurality of customer accounts.

* * * * *